March 5, 1940. W. W. GORE 2,192,468
LAWN MOWER
Filed Sept. 5, 1939 4 Sheets-Sheet 1
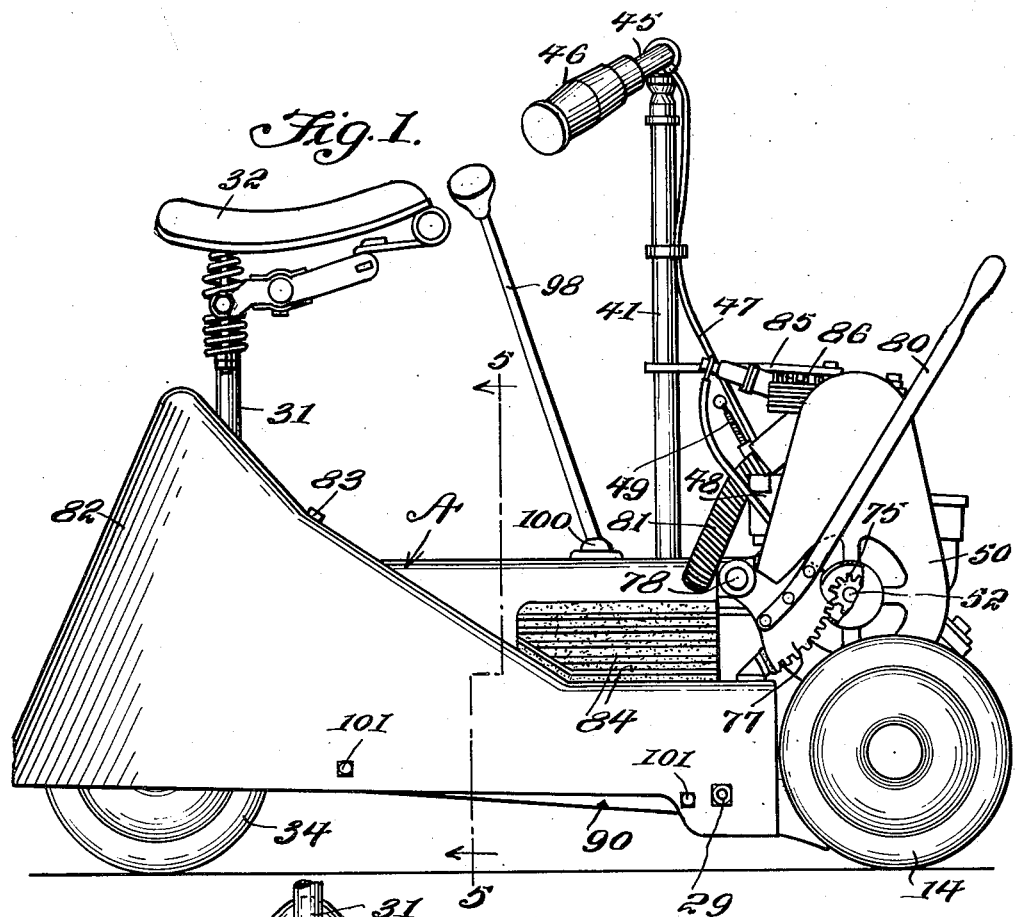
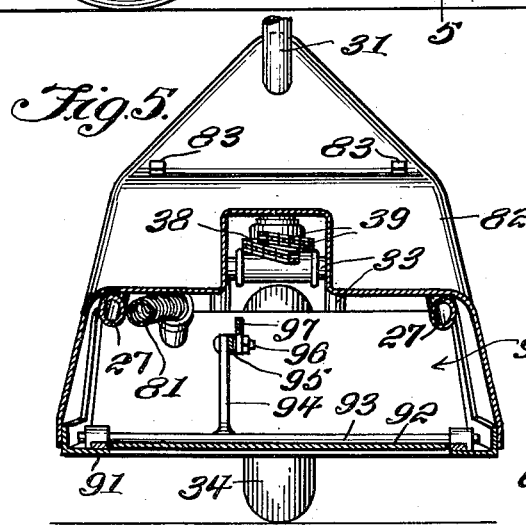
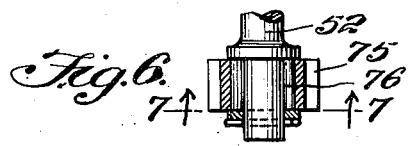
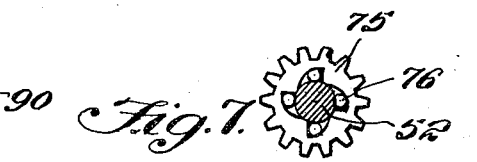
William Walker Gore
INVENTOR
BY Victor J. Evans & Co.
ATTORNEYS
WITNESS J. T. L. Wright

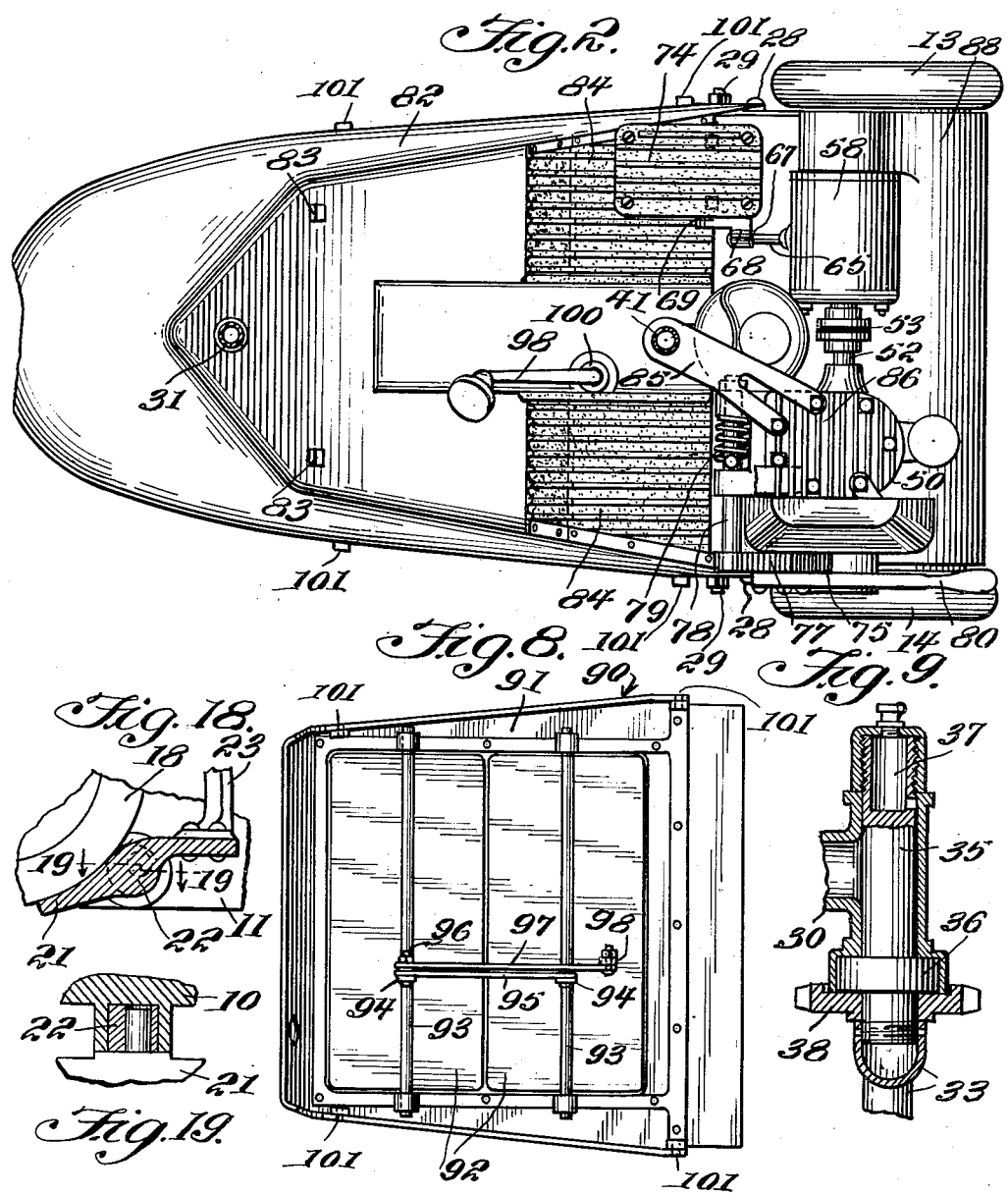

March 5, 1940.  W. W. GORE  2,192,468
LAWN MOWER
Filed Sept. 5, 1939   4 Sheets-Sheet 3
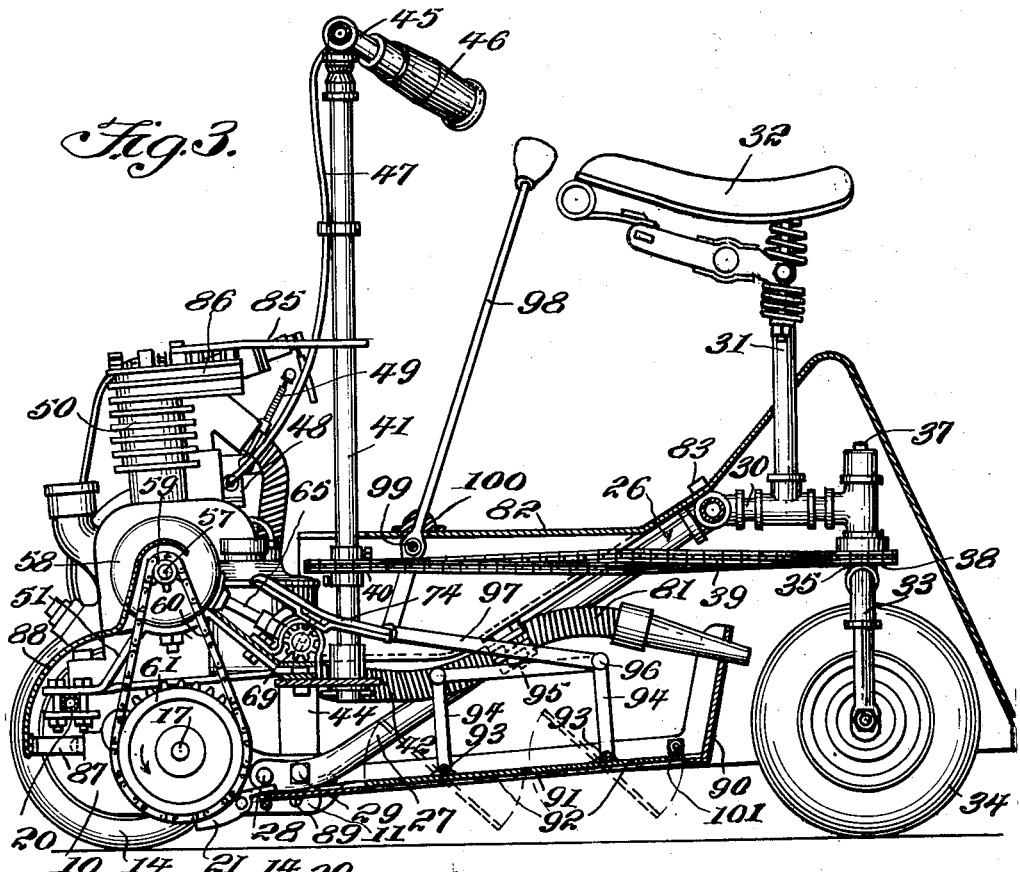
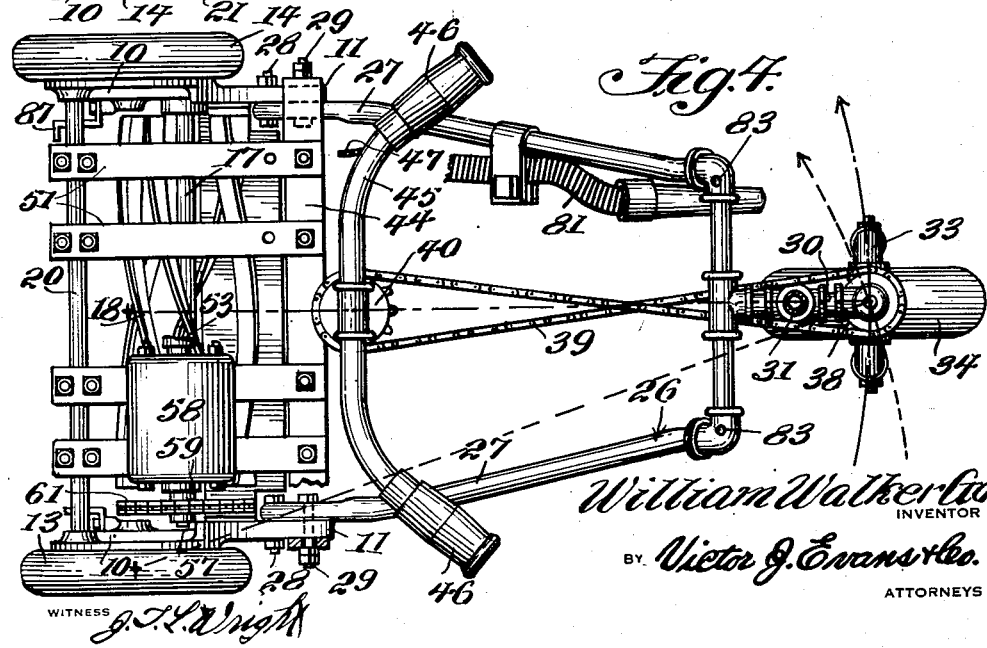
William Walker Gore
INVENTOR
BY Victor J. Evans & Co.
ATTORNEYS

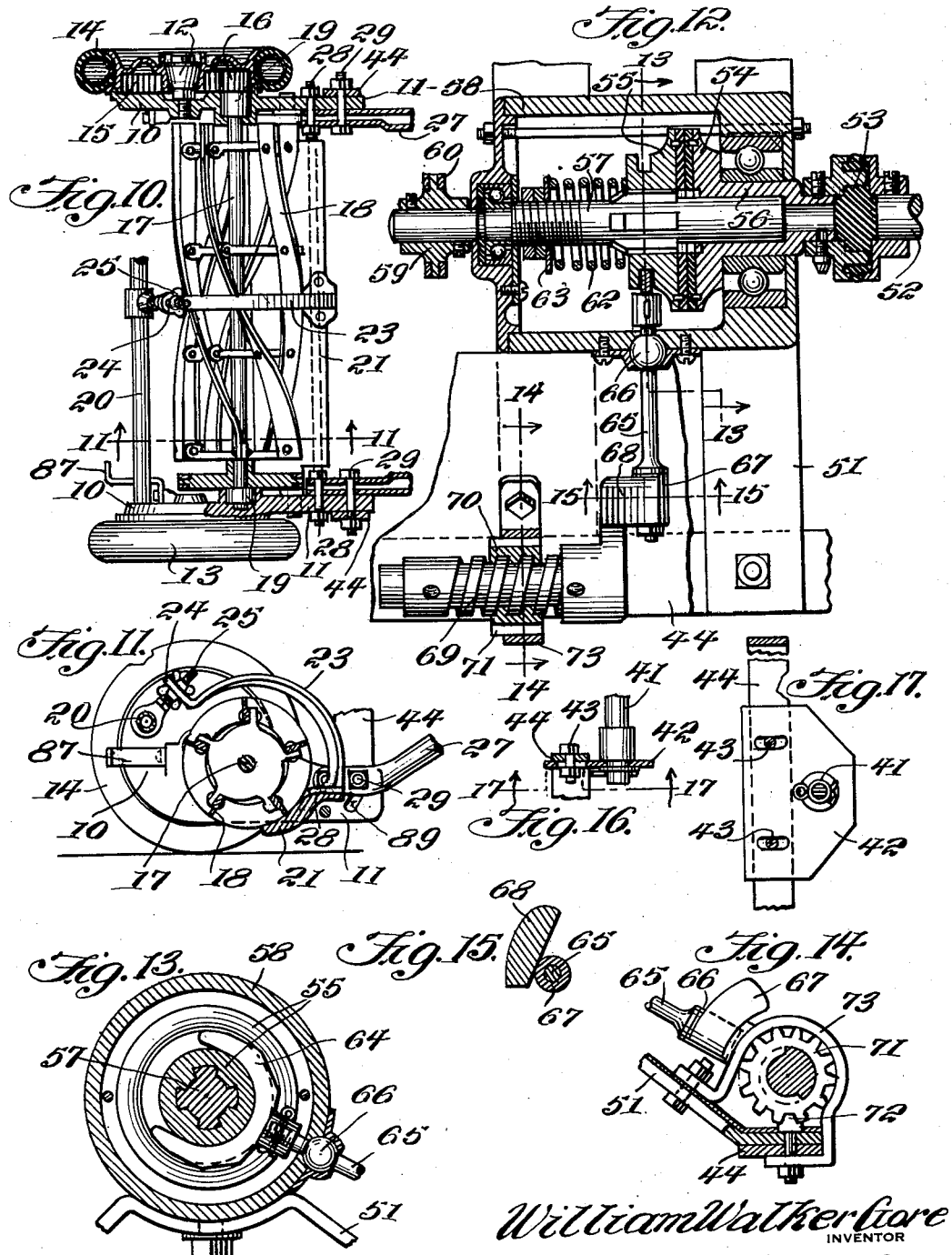

Patented Mar. 5, 1940

2,192,468

UNITED STATES PATENT OFFICE 2,192,468

LAWN MOWER

William Walker Gore, Hewett, W. Va.

Application September 5, 1939, Serial No. 293,472

6 Claims. (Cl. 56—26)

The invention relates to a lawn mower and more especially to a motor driven lawn mower of the riding type.

The primary object of the invention is the provision of a lawn mower of this character, wherein the user thereof can readily ride the same and such mower is under control of the rider so that grass upon a lawn can be readily and conveniently cut and particularly in close places due to the fact that the lawn mower is susceptible of being guided and turned in the least possible area, this being essential when cutting close to shrubbery, trees or the like.

Another object of the invention is the provision of a lawn mower of this character, wherein the cut grass can be caught within a grass catcher and the latter dumped at the will of the rider of such mower, thereby eliminating the hand raking of the cut grass from a lawn during the use of the mower.

A further object of the invention is the provision of a mower of this character, wherein should the same become disrupted in its travel through roots, stumps or the like interfering with the cutter reel the mower can be stopped instantly to relieve any possibility of damage and also instantly upon the choking of the mower through a clutch action the driving power will be relieved and thus avoid interference in the operation of its motor whether of the gasoline or electric driven type.

A still further object of the invention is the provision of a mower of this character, wherein the cutter reel and its stationary cutter bar can be adjusted so as to enable variation in the height of cutting action of the lawn mower either for cutting the grass close or allowing it to grow to a certain height, that is to say, cutting it high.

A still further object of the invention is the provision of a mower of this character, wherein the motor is started by an operating starter lever, being of novel construction and convenient for easy operation thereof.

A still further object of the invention is the provision of a mower of this character, wherein the clutch connecting the driving shaft of the motor with the cutter reel is foot controlled, the latter being of novel construction and is conveniently located for easy operation thereof.

A still further object of the invention is the provision of a mower of this character, wherein a pilot wheel is manually turned to regulate the steering of the said mower and wide or narrow turns effected thereby.

A still further object of the invention is the provision of a mower of this character, which is simple in its construction, thoroughly reliable and effective in operation, assured of riding comfort, susceptible of positive control by the rider, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention and pointed out in the claims hereunto appended.

In the accompanying drawings:

Figure 1 is a side elevation partly in section of a lawn mower constructed in accordance with the invention.

Figure 2 is a fragmentary top plan view thereof.

Figure 3 is a vertical longitudinal sectional view of the same.

Figure 4 is a fragmentary top plan view with the covering shield removed.

Figure 5 is a sectional view on the line 5—5 of Figure 1 looking in the direction of the arrows.

Figure 6 is a fragmentary horizontal sectional view through an overrun clutch associated with the starter lever.

Figure 7 is a sectional view on the line 7—7 of Figure 6 looking in the direction of the arrows.

Figure 8 is a fragmentary horizontal sectional view showing in detail the grass catcher with the discharging shutters for the cut grass.

Figure 9 is a fragmentary vertical sectional view through the pilot wheel fork and adjuncts.

Figure 10 is a fragmentary plan view partly in section at the cutting reel end of the mower.

Figure 11 is a sectional view taken on the line 11—11 of Figure 10 looking in the direction of the arrows.

Figure 12 is an enlarged fragmentary plan partly in section through the clutch and adjuncts.

Figure 13 is a sectional view taken on the line 13—13 of Figure 12 looking in the direction of the arrows.

Figure 14 is a sectional view taken on the line 14—14 of Figure 12 looking in the direction of the arrows.

Figure 15 is a fragmentary sectional view taken on the line 15—15 of Figure 12 looking in the direction of the arrows.

Figure 16 is a sectional view on the line 16—16 of Figure 3 looking in the direction of the arrow.

Figure 17 is a sectional view taken on the line

17—17 of Figure 16 looking in the direction of the arrows.

Figure 18 is a fragmentary enlarged vertical sectional view through the stationary cutter bar of the mower.

Figure 19 is a horizontal sectional view on the line 19—19 of Figure 18 looking in the direction of the arrows.

Similar reference characters indicate corresponding parts throughout the several views in the drawings.

Referring to the drawings in detail, A designates generally the riding type of lawn mower constructed in accordance with the invention and comprises a cutting reel frame having end plates 10 formed with rearwardly directed wings 11, the plates being provided with stud axles, one indicated at 12, and upon these are journaled rubber tired traction wheels 13 and 14, respectively. The traction wheel 14 is provided with an internal ring gear 15 meshing with a companion pinion 16 fixed to the driving shaft 17 of a rotary bladed cutter reel 18, the blades of which are spirally arranged in spaced relation to each other and are concentrically about the said shaft 17, which is journaled at 19 in the cheeks 10. These cheeks in their spaced end relation to the frame are joined by a cross front tie rod 20. Coacting with the blades of the reel 18 is an eccentrically shiftable non-rotatable cutter bar 21, being supported on eccentrics 22 fitting the wings 11 so that the said bar is susceptible of adjustment toward and away from as well as angularly with respect to the lay of the reel 18, that is to say, the spiral blades thereof. This bar 21 at the rear or heel edge thereof has fixed medially of its length an upwardly and forwardly curved adjusting arm 23 formed with a perforated terminal 24 engaged by an adjustable clamp 25 fitted to the rod 20 and in this manner the said non-rotatable cutter bar 21 is adjustably sustained.

Rearwardly of the reel frame is a riding chassis frame 26 of substantially U shape. The open side of this frame is forward and the closed side rearward while the side members 27 of this frame are swingably connected by pivots 28 to the wings 11. Such frame is disposed in a forward inclined position, being adjustably held with relation to the reel frame by nut-carrying bolts 29 so that the said frame 26 and the reel frame may be moved relative to each other to allow for close cutting or long cutting of growing grass in that the reel 18 can be lowered or raised with respect to the ground and held in this adjusted position.

From the closed side of the frame 26 at the longitudinal median of the mower extends rearwardly a horizontal extension 30 for a seat post 31 carrying a spring cushioned seat 32 and also has journaled therein a rear steering wheel fork 33 in which is journaled a pilot or steering wheel 34, the stem 35 of the fork 33 being associated with a bearing 36 and is equipped for lubrication at 37. The stem 35 has fixed thereto a sprocket gear 38 over which is trained an endless sprocket chain 39, its stretches being crossed with relation to each other. This chain is also trained over a sprocket gear 40 fixed to a steering post 41 rising vertically and has its lower end journaled in an adjustable bearing plate 42 adjustably bolted at 43 to a bridge member 44 associated with the reel frame rearwardly thereof. The adjustment of the bearing plate 42 allows for the slackening and tightening of the chain 39 about the gears in association therewith. The steering post 41 at its upper end is equipped with a cross handle bar 45 having handle grips 46, one being cooperative with a throttle control 47 for the carburetor 48 having coacting therewith a conventional choke 49 and connected with an internal combustion engine 50 of the single cylinder air cooled type.

In the disposition of the steering or pilot wheel 34 with relation to the traction wheels 13 and 14, the turning arc of the lawn mower will be in conformity therewith for wide or short turning of the same. When the wheel 34 is disposed crosswise of the mower in parallel relation to the axis of the reel 18, the center of the turning arc will be midway between the wheels 13 and 14 as is indicated by the arrow in Figure 4 of the drawings. On disposition of the wheel 34 to have the center of the turning arc of the lawn mower registering with the longitudinal center of the wheel 13, the said lawn mower will swing in the arc indicated by the other arrow appearing in Figure 4 of the drawings and in this way varying the circular turning of said mower.

The motor 50 is carried upon a suitable support 51 built into the reel frame and its driving shaft 52 through a flexible universal coupling 53 cooperates with a friction clutch including the separable companion clutch members 54 and 55, respectively, common to shaft sections 56 and 57, the member 55 being slidably splined upon the latter. These shaft sections 56 and 57 are suitably journaled within a cylindrical casing or housing 58 made fast upon the support 51 and the shaft section 57 exteriorly of said casing or housing 58 has fixed thereto a sprocket gear 59 having trained thereover an endless sprocket chain 60, being also trained over a sprocket gear 61 fixed to the shaft 17 of the reel 18 so that when the clutch is closed between the motor and the said reel power from such motor will be transferred to the reel for the driving thereof and the latter drives the wheel 14 for the advancement of the lawn mower over a lawn and in the execution of grass cutting.

The clutch member 55 is spring pressed into frictional engagement with the member 54 by a coiled compression spring 62 surrounding the shaft section 57 and held active upon a seat 63 fixed to said shaft section 57. The member 55 is peripherally grooved for the fitting therewith of a clutch releasing fork 64 joined with a clutch throw arm 65 fitted at 66 for universal movement to the housing or casing 58. The arm 65 carries a contact roller 67 engageable by a cam ear 68 extending from a turnable and longitudinally shiftable feed screw 69 threaded in a stationarily held bearing 70, being externally toothed at 71 for adjustment thereof relative to the screw 69 which is engaged with a locking tooth 72 fixed in the support 51. The bearing is held in a ball 73 stationarily fitted to the said support, the screw 69 being elongated and its threads on rotation advance the cam ear 68 toward and away from the arm 65 at the roller 67 thereon and in this manner the clutch including the members 54 and 55 will be declutched through foot pedal operation of the screw 69, the foot pedal being indicated at 74 conveniently arranged forwardly of the seat 32 and at one side with respect to the steering post 41. The foot pedal 74 is pinned to the screw 69 for separable dial connection therebetween.

The driving shaft 52 of the motor 50 has equipped therewith a starting cog gear 75, being supplied with an overrun clutch 76 for coaction with said shaft 51 and adapted for meshing engagement with this cog gear 76 is a toothed rack segment 77 vertically swingable on a pivot 78 and normally out of mesh with said gear 76, being held in this position by a coiled tensioning spring 79. The segment 77 has fixed thereto an upwardly directed starting lever 80 so that through operation of the latter the motor 50 can be started and this lever 80 is thrown by hand for the starting operation.

The motor as is customary is equipped with an exhaust pipe 81 which is bracketed beneath a hood or covering 82 detachably fastened at 83 in place so as to conceal the working parts in the majority of the said lawn mower and this hood or cover 82 is arranged with foot treads or foot rests 84.

The steering post 41, which is turnable in the bearing 42, is steadied by a bracket 85 fastened to the crown 86 of the motor 50 and this motor may be either of the internal combustion type or an electric motor.

The proper speed ratio between the motor and the wheel 14 and cutter reel 18 is established as may be required through the gearing and chain connections therebetween.

By suitable brackets 87 a front shield 88 is built with the reel frame of the lawn mower.

The adjustable fasteners 29 for the side members of the frame 26 work in arcuate slots 89 provided in the wings 11 for the reel adjustment of the reel frame and the said chassis frame 26.

Arranged in trailing relation to the reel 18 and the reel frame is a grass catching tray 90 provided with an open bottom 91 closed by vertically swingable shutters or louvers 92, the turning axles 93 therefor having fixed thereto turning arms 94 linked together at 95 and one of the pivots 96 for the link 95 has connected therewith a shift rod 97 operated upon by a throw lever 98 swingable at 99 and extended upwardly in convenient position through the hood or covering 82 with respect to the seat 32 so that an occupant or operator of the machine can readily actuate the said lever 98 and thereby control the shutters or louvers 92 for the opening and closing of the tray 90 in the collection of cut grass and the dumping thereof. The lever 98 is accommodated in a rubber guard 100 for the clearance of said lever in the hood or cover 82, the said guard being fitted to the latter in any suitable manner.

The hood or cover is readily removable or detachable from the mower frames, this being also true with respect to the front shield 88 so that the working parts of said mower will be readily accessible for any purposes as may be required.

In declutching the clutch on moving the member 55 against the resistance of the spring 62 thereon the fork 64 engaging said member 55 frictionally binds this member 55 resulting in a braking action upon the reel 18 and the driving wheel 14 of the mower so as to enable quick stopping of the latter.

In the operation of the reel 18, should it become choked, slippage will occur between the members 54 and 55 when in frictional clutched engagement with each other to eliminate any damage to the reel or the blades thereof.

The adjustment of the non-rotatable bar 21 with respect to the blades of the reel 18 assures of proper cutting operation of the lawn mower in the use thereof and in this manner wear upon these can be taken up and the continued cutting operation of such mower had.

The hood or cover 82 is skirted at proper localities for shielding or guarding purposes. The stopping or working of the motor is accomplished in any desirable manner. By actuating the handle bar 45, the pilot or steering wheel 34 is turned for the steering or guiding of the lawn mower in the working of the same.

What is claimed is:

1. In a lawn mower, a rotary cutting reel frame, ground wheels journaled on the frame, a rotary cutting reel journaled in the frame, driven connections between the reel and one wheel, a riding frame pivoted to the reel frame, means for adjusting the frames relative to each other, a power unit supported on the reel frame and having driving connections with said reel, a non-rotatable cutter bar eccentrically movable on the reel frame for coaction with the reel, an adjusting arm connected with the reel frame and cutter bar, a foot operated clutch included in the driving connections and effective for braking on declutching operation, a pilot wheel connected to the riding frame and centered with respect to the reel frame, and steering mechanism fitted to the reel frame and operating the pilot wheel.

2. In a lawn mower, a rotary cutting reel frame, ground wheels journaled on the frame, a rotary cutting reel journaled in the frame, driven connections between the reel and one wheel, a riding frame pivoted to the reel frame, means for adjusting the frames relative to each other, a power unit supported on the reel frame and having driving connections with said reel, a non-rotatable cutter bar eccentrically movable on the reel frame for coaction with the reel, an adjusting arm connected with the reel frame and cutter bar, a foot operated clutch included in the driving connections and effective for braking on declutching operation, a pilot wheel connected to the riding frame and centered with respect to the reel frame, steering mechanism fitted to the reel frame and operating the pilot wheel, and a cam having feed screw action for said clutch.

3. In a lawn mower, a rotary cutting reel frame, ground wheels journaled on the frame, a rotary cutting reel journaled in the frame, driven connections between the reel and one wheel, a riding frame pivoted to the reel frame, means for adjusting the frames relative to each other, a power unit supported on the reel frame and having driving connections with said reel, a non-rotatable cutter bar eccentrically movable on the reel frame for coaction with the reel, an adjusting arm connected with the reel frame and cutter bar, a foot operated clutch included in the driving connections and effective for braking on declutching operation, a pilot wheel connected to the riding frame and centered with respect to the reel frame, steering mechanism fitted to the reel frame and operating the pilot wheel, a cam having feed screw action for said clutch, and a dumping grass catcher built with the reel frame and having a dumping shutter bottom.

4. In a lawn mower, a rotary cutting reel frame, ground wheels journaled on the frame, a rotary cutting reel journaled in the frame, driven connections between the reel and one wheel, a riding frame pivoted to the reel frame, means for adjusting the frames relative to each other, a power unit supported on the reel frame and having driving connections with said reel, a non-rotatable cutter bar eccentrically movable on the reel frame for coaction with the reel, an adjusting arm connected with the reel frame and cutter bar, a foot operated clutch included in the driving connections and effective for braking on declutching operation, a pilot wheel connected to the riding frame and centered with respect to the reel frame, steering mechanism fitted to the reel frame and operating the pilot wheel, a cam having feed screw action for said clutch, a dumping grass catcher built with the reel frame and having a dumping shutter bottom, and a manually operated lever controlling said bottom.

5. In a lawn mower, a rotary cutting reel frame, ground wheels journaled on the frame, a rotary cutting reel journaled in the frame, driven connections between the reel and one wheel, a riding frame pivoted to the reel frame, means for adjusting the frames relative to each other, a power unit supported on the reel frame and having driving connections with said reel, a non-rotatable cutter bar eccentrically movable on the reel frame for coaction with the reel, an adjusting arm connected with the reel frame and cutter bar, a foot operated clutch included in the driving connections and effective for braking on declutching operation, a pilot wheel connected to the riding frame and centered with respect to the reel frame, steering mechanism fitted to the reel frame and operating the pilot wheel, a cam having feed screw action for said clutch, a dumping grass catcher built with the reel frame and having a dumping shutter bottom, a manually operated lever controlling said bottom, and chain and sprocket connections included in the steering mechanism.

6. In a lawn mower, a rotary cutting reel frame, ground wheels journaled on the frame, a rotary cutting reel journaled in the frame, driven connections between the reel and one wheel, a riding frame pivoted to the reel frame, means for adjusting the frames relative to each other, a power unit supported on the reel frame and having driving connections with said reel, a non-rotatable cutter bar eccentrically movable on the reel frame for coaction with the reel, an adjusting arm connected with the reel frame and cutter bar, a foot operated clutch included in the driving connections and effective for braking on declutching operation, a pilot wheel connected to the riding frame and centered with respect to the reel frame, steering mechanism fitted to the reel frame and operating the pilot wheel, a cam having feed screw action for said clutch, a dumping grass catcher built with the reel frame and having a dumping shutter bottom, a manually operated lever controlling said bottom, chain and sprocket connections included in the steering mechanism, and means forming a bearing for the steering mechanism and for tightening and slackening the chain connection.

WILLIAM WALKER GORE.